US012747158B2

(12) United States Patent
Lif et al.

(10) Patent No.: US 12,747,158 B2
(45) Date of Patent: Sep. 29, 2026

(54) ANTI-CAKING COMPOSITION OF SODIUM CHLORATE

(71) Applicant: NOURYON CHEMICALS INTERNATIONAL B.V., Arnhem (NL)

(72) Inventors: Johan Lif, Deventer (NL); Kimona Häggström, Deventer (NL)

(73) Assignee: NOURYON CHEMICALS INTERNATIONAL B.V., Arnhem (NL)

( * ) Notice: Subject to any disclaimer, the term of this patent is extended or adjusted under 35 U.S.C. 154(b) by 1077 days.

(21) Appl. No.: 17/807,388

(22) Filed: Jun. 17, 2022

(65) Prior Publication Data

US 2022/0402758 A1 Dec. 22, 2022

(30) Foreign Application Priority Data

Jun. 18, 2021 (EP) .................................... 21180471

(51) Int. Cl.
*C01B 11/14* (2006.01)

(52) U.S. Cl.
CPC .................................. *C01B 11/145* (2013.01)

(58) Field of Classification Search
None
See application file for complete search history.

(56) References Cited

U.S. PATENT DOCUMENTS

2004/0109897 A1* 6/2004 Annis .................... A61K 47/02 424/489
2019/0284050 A1 9/2019 Kuwahata

FOREIGN PATENT DOCUMENTS

| | | | |
|---|---|---|---|
| CN | 110558318 | A | 12/2019 |
| FR | 2862957 | A1 | 6/2005 |
| GB | 451894 | A | 8/1936 |
| GB | 860651 | A | 2/1961 |
| JP | 2017145203 | A | 8/2017 |
| JP | 2021006506 | A | 1/2021 |

OTHER PUBLICATIONS

ERCO Worldwide, Sodium chlorate crystal WHMIS controlled product, 2015 (ERCO Worldwide) (Year: 2015).*
Birnbaum et al., Sodium chlorate, data taken at Pacific Northwest National Laboratory (Birnbaum) (Year: 2018).*
EPO, Extended European Search Report issued in EP Appl. No. 21180471.1, dated Dec. 14, 2021.

* cited by examiner

*Primary Examiner* — Keling Zhang
(74) *Attorney, Agent, or Firm* — Ingrassia, Fisher & Lorenz LLP

(57) ABSTRACT

A package comprises a powder composition comprising from about 97.0 to about 99.7 weight % of sodium chlorate and from about 0.3 to about 2.0 weight % of an anti-caking agent, wherein the anticaking agent is anhydrous sodium carbonate, anhydrous sodium hydrogen carbonate, sodium carbonate monohydrate or a mixture of any of the foregoing.

16 Claims, 1 Drawing Sheet

ANTI-CAKING COMPOSITION OF SODIUM CHLORATE

CROSS-REFERENCE TO RELATED APPLICATION

This application claims the benefit of, and priority to, European Application No. 21180471.1, filed Jun. 18, 2021, which is hereby expressly incorporated in its entirety by reference.

TECHNICAL FIELD

The present disclosure relates to anti-caking compositions of sodium chlorate comprising as an anti-caking agent anhydrous sodium carbonate, anhydrous sodium hydrogen carbonate, sodium carbonate monohydrate or a mixture of any of the foregoing. The present disclosure further relates to a method of packaging a powder composition comprising sodium chlorate and to the use of anhydrous sodium carbonate, anhydrous sodium hydrogen carbonate, sodium carbonate monohydrate or a mixture of any of the foregoing as an anti-caking agent in a package containing a powder composition comprising sodium chlorate.

BACKGROUND

Sodium chlorate is a commonly known compound which is widely used for the generation of chlorine dioxide required in particular for the bleaching of pulp. One important advantage of sodium chlorate is that it is a safe transportable source of chlorine dioxide from which the chloride dioxide, being a toxic and corrosive gas, can be generated just on the bleaching site in the amounts as required. Processes for generating chlorine dioxide from sodium chlorate are for instance described in the review article "Manufacture of Chlorine Dioxide from Sodium Chlorate: State of the Art" of B. R. Deshwal and H. K. Lee (J. Ind. Eng. Chem., Vol. 11, No. 3 (2005) 330-346). Another common application of sodium chlorate is in herbicidal compositions.

However, caking of sodium chlorate may occur over time, for instance during storage under humid conditions or delayed transportation, such as for more than 40 days. In order to reduce such caking, various anti-caking additives have been proposed for adding to the sodium chlorate. Known anti-caking agents are for instance calcium chloride, silica, quicklime, sodium hydroxide, magnesium oxide, magnesium carbonate and magnesium hydroxide. It has also been suggested to add surfactants as anticaking agents in sodium chlorate (for example suggested by CN106757134, CN1319559 and CN108560014). However, addition of organic compounds to sodium chlorate is highly undesirable from a safety perspective.

GB 1291916 A describes herbicidal composition comprising an alkali metal chlorate such as sodium chlorate and 0.5-1% by weight calcium chloride. It is taught that the calcium chloride prevents caking during storage. However, calcium chloride has the disadvantage that the calcium and the sulphate from the sulphuric acid used in the process to generate the chlorine dioxide form calcium sulphate. The calcium sulfate will precipitate and produce a scaling which may block pipes, valves, etc. of the chlorine dioxide process equipment.

GB 1422666 A discloses a process for producing a herbicidal composition not liable to explode and comprising at least one alkali metal or alkaline earth metal chlorate, at least one residual organic herbicide, at least 2% of inert antilumping filler and from 4 to 20% of water. The antilumping filler, i.e. an anti-caking additive, is described to be for instance silica. Also GB 1460446 A discloses a weed killer composition comprising from 40 to 70% of a chlorate salt, such as potassium or sodium chlorate, from 15 to 60% of urea and inter alia an anti-caking agent such as silica or inorganic silicates. However, silica or silicates have the disadvantage that it tends to foam the reactor solution in the chlorine dioxide generator. Such foaming may result in undesirable decomposition of chlorine dioxide which may even pose a safety hazard.

GB 617778 A describes a method of drying basic chlorate and mixing it with a small proportion of quicklime to prevent agglomeration. The obtained composition may be used as a weed killer or converted into pure chlorate by suspension in water and removal of precipitated lime. However, quicklime or lime contain calcium ions and—as already set forth above—these calcium ions form undesirable scaling in the presence of sulphate ions from the sulphuric acid which is commonly used for generation of chlorine dioxide.

JPS 4330177 proposes to prevent the caking of dry sodium chlorate by adding 0.2-0.5% sodium hydroxide (powder with 97% purity) and thorough mixing of the obtained composition. However, the use of sodium hydroxide in the process of generating chlorine dioxide from sodium chlorate is undesirable in view of overall process efficiency. Moreover, the required thorough mixing is time-consuming and produces costs.

BE 645093 discloses alkali metal chlorate powders and teaches that the addition of 0.5-2% of fine grained amorphous silica to sodium chlorate or other alkali metal chlorate powders confers better anti-caking properties than the commonly used magnesium oxide, magnesium hydroxide or magnesium carbonate. The powders are used as weed eradicators, in the printing industry, as oxidizing agents, and in general for chemical manufacture. However, the presence of magnesium ions in a process of producing chlorine dioxide has similar disadvantages as the presence of calcium ions, i.e. precipitates may form (magnesium sulphate) which may clog the equipment used.

It has been further proposed to add significant amounts of non-oxidizing compounds of alkali and alkaline earth metals, such as sodium carbonate, to chlorates in order to reduce the fire hazard and to obtain powders which can be safely transported and stored. For example, GB 451894 suggests the use of at least 5% by weight of non-oxidizing compounds of an alkali or alkaline earth metal to reduce the fire hazard and in the examples of GB 451894 even 6:4 mixtures of sodium chlorate and sodium carbonate are used. GB 860651 even suggests using 48 to 54% by weight sodium carbonate compared to 17.5 to 21% by weight of sodium chlorate, i.e. a more than two-time excess of sodium carbonate, to obtain a bleaching powder which can be safely transported and stored. FR 2862957 suggests the use of at least one hydrogen carbonate of an alkali or alkaline earth metal, for example sodium hydrogen carbonate, in amounts of at least 5 weight % to reduce the oxidizing power of sodium chlorate and thereby facilitate its transportation. It is further disclosed that the hydrogen carbonate should be separated from the sodium chlorate before using the sodium chlorate to generate chlorine dioxide. However, such additional separation step is not desirable from a cost and environmental perspective.

In view of the foregoing, there is a need for improved packages of powder compositions comprising as the main component sodium chlorate and further an anti-caking agent, wherein the anti-caking agent should be present in an amount as low as possible in order to provide as pure sodium chlorate as possible, typically with a purity of ≥99.0 weight %, and should not cause problems, such as the formation of precipitates or undesirable foaming during chlorine dioxide generation, and, at the same time, should be highly effective in preventing the sodium chlorate from caking over a period of at least 40 days, typically over a period of at least 80 days or even over at least 120 days. It would also be desirable if such highly effective prevention of the sodium chlorate to cake can be achieved by adding the anti-caking agent to the sodium chlorate without the need for extensive mixing, typically without the need for any mixing at all. Moreover, there is a need for improved methods of packaging such a powder composition comprising sodium chlorate, whereby the method effectively ensures that no caking of the sodium chlorate composition occurs over a period of at least 40 days, typically over a period of at least 80 days or even over at least 120 days.

BRIEF SUMMARY

This disclosure provides a package comprising a powder composition comprising:

- from about 97.0 to about 99.7 weight % of sodium chlorate; and
- from about 0.3 to about 2.0 weight % of an anti-caking agent;
- wherein the anticaking agent is anhydrous sodium carbonate, anhydrous sodium hydrogen carbonate, sodium carbonate monohydrate or a mixture of any of the foregoing.

This disclosure also provides a method of packaging a powder composition comprising sodium chlorate, the method comprising the steps of:

- providing a container; and
- adding to the container from about 97.0 to about 99.7 weight % sodium chlorate and from about 0.3 to about 2.0 weight % of an anti-caking agent, wherein the anticaking agent is anhydrous sodium carbonate, anhydrous sodium hydrogen carbonate, sodium carbonate monohydrate or a mixture of any of the foregoing,
- wherein optionally the sodium chlorate and the anti-caking agent are added stepwise without substantial mixing thereby forming a heterogenous mixture comprising two or more phases, wherein a first phase comprises ≥about 50 weight % sodium chlorate and a second phase comprises ≥about 50 weight % of the anti-caking agent.

BRIEF DESCRIPTION OF THE DRAWINGS

The present disclosure will hereinafter be described in conjunction with the following drawing Figures, and.

DETAILED DESCRIPTION OF THE DISCLOSURE

Figure 1:
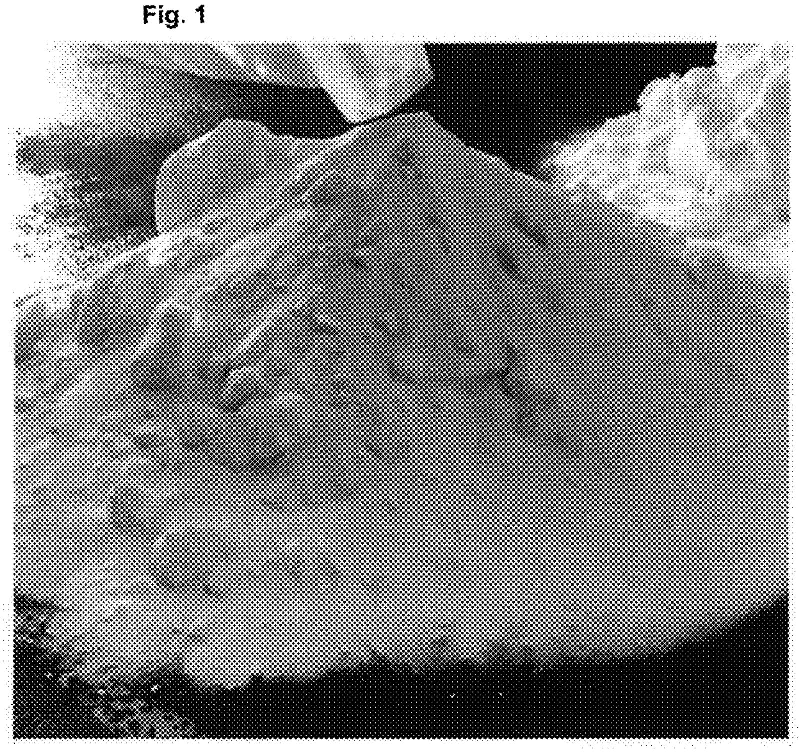
FIG. 1 is a photo of the sodium carbonate composition according to the present disclosure from Example 1 after being stored for 150 days.

The following detailed description is merely exemplary in nature and is not intended to limit the disclosure or the application and uses of the subject matter as described herein. Furthermore, there is no intention to be bound by any theory presented in the preceding background or the following detailed description. It is to be appreciated that all numerical values as provided herein, save for the actual examples, are approximate values with endpoints or particular values intended to be read as "about" or "approximately" the value as recited.

Surprisingly, it has been found that at least the above objects are solved by a package comprising from 97.0 to 99.7 weight % of sodium chlorate and from 0.3 to 2.0 weight % of an anti-caking agent; wherein the anti-caking agent is anhydrous sodium carbonate, anhydrous sodium hydrogen carbonate, sodium carbonate monohydrate or a mixture of any of the foregoing.

The present disclosure further relates to a method of packaging a powder composition comprising sodium chlorate, the method comprising the steps of providing a container and adding to the container from 97.0 to 99.7 weight % sodium chlorate and from 0.3 to 2.0 weight % of an anti-caking agent, wherein the anti-caking agent is anhydrous sodium carbonate, anhydrous sodium hydrogen carbonate, sodium carbonate monohydrate or a mixture of any of the foregoing.

The present disclosure further relates to the use of anhydrous sodium carbonate, anhydrous sodium hydrogen carbonate, sodium carbonate monohydrate or a mixture of any of the foregoing as an anti-caking agent in a package containing a powder composition comprising at least 97.0 weight % sodium chlorate.

The present disclosure provides a package containing a powder composition comprising from 97.0 to 99.7 weight % of sodium chlorate and from 0.3 to 2.0 weight % of an anti-caking agent; wherein the anti-caking agent is anhydrous sodium carbonate, anhydrous sodium hydrogen carbonate, sodium carbonate monohydrate or a mixture of any of the foregoing. Surprisingly, it has been found that the powder composition in such a package which contains anhydrous sodium carbonate, anhydrous sodium hydrogen carbonate, sodium carbonate monohydrate or a mixture of any of the foregoing in very low amounts of 2 weight % or less provides anti-caking properties of the powder composition. Rather, it has surprisingly been found that such powder compositions do not cake even when stored for 150 days. Moreover, the presence of this low amount of anhydrous sodium carbonate, anhydrous sodium hydrogen carbonate, sodium carbonate monohydrate or a mixture of any of the foregoing in the sodium chlorate powder composition do not cause any problems during chlorine dioxide generation. Hence, also a powder composition as such as contained in the package is described herein.

The package may be any container suitable for containing, transporting and/or storing sodium chlorate, such as for instance bags made from polymeric material such as polypropylene, wherein the polymeric material may be in a woven structure, plastic containers, such as for instance made from polyethylene or any other suitable polymer, or metal containers, such as for instance made from aluminum or any suitable metal alloy. The package, for instance bags from polymeric materials, in particular if having a woven structure, may further contain a liner, such as a liner of polyethylene or any other suitable polymeric material. Typical are bags made from polymeric material, in particular made from polypropylene which may be in a woven form.

The powder composition contained in the package comprises from 97.0 to 99.7 weight %, typically from 98.0 to 99.7 weight %, more typically from 98.2 weight % to 99.7 weight %, even more typically from 98.5 to 99. weight % and most typically from 99.0 to 99.7 weight % of sodium chlorate ($NaClO3$). These amount ranges may be based on the dry weight of the sodium chlorate. In other words, these amount ranges exclude any water potentially present in trace amounts in the sodium chlorate.

The powder composition contained in the package further comprises from 0.3 to 2.0 weight %, typically from 0.3 to 1.5 weight %, more typically from 0.3 to 1.0% weight % and even more typically from 0.5 to 0.9 weight % of anhydrous sodium carbonate, anhydrous sodium hydrogen carbonate, sodium carbonate monohydrate or a mixture of any of the foregoing as anticaking agent. These amount ranges may be based on the dry weight of the powder composition.

Hence, in a typical embodiment, the package of the present disclosure contains a powder composition comprising from 98.0 to 99.7 weight % of sodium chlorate and from 0.3 to 2.0 weight % of anhydrous sodium carbonate, anhydrous sodium hydrogen carbonate, sodium carbonate monohydrate or a mixture of any of the foregoing. In a more typical embodiment, the package of the present disclosure contains a powder composition comprising from 98.2 to 99.7 weight % of sodium chlorate and from 0.3 to 1.0 weight % of anhydrous sodium carbonate, anhydrous sodium hydrogen carbonate, sodium carbonate monohydrate or a mixture of any of the foregoing. In an even more typical embodiment, the package of the present disclosure contains a powder composition comprising from 99.0 to 99.7 weight % of sodium chlorate and from 0.3 to 1.0 weight % of anhydrous sodium carbonate, anhydrous sodium hydrogen carbonate, sodium carbonate monohydrate or a mixture of any of the foregoing. In all of the compositions described herein, the amount of all components comprised in the compositions add up to 100 weight % and refers to weight percentage of the total weight of the powder composition.

The anti-caking agent is anhydrous sodium carbonate ($Na2CO3$), anhydrous sodium hydrogen carbonate ($NaHCO_3$), sodium carbonate monohydrate ($Na_2CO_3 \cdot H_2O$) or a mixture of any of the foregoing. Anhydrous means that the sodium carbonate or the sodium hydrogen carbonate is essentially free of any water. Anhydrous sodium carbonate may be formed by heating hydrate(s) of the sodium carbonate. For example, hydrate forms of sodium carbonate are sodium carbonate decahydrate ($Na_2CO_3 \cdot 10\ H_2O$), sodium carbonate heptahydrate ($Na_2CO_3 \cdot 7\ H_2O$) and sodium carbonate monohydrate ($Na_2CO_3 \cdot H_2O$). Sodium carbonate monohydrate is the monohydrate form of sodium carbonate. The water molecule in this compound is also called crystal water.

The anti-caking agents; anhydrous sodium carbonate, anhydrous sodium hydrogen carbonate and sodium carbonate monohydrate can be used alone or in any combination of two or more thereof in any ratio. If for example, a mixture of any two of the anti-caking agents is used, the ratio of the two anti-caking agents can be such as from 1/99 to 99/1 or from 10/90 to 90/10 or from 20/80 to 80/20 or from 30/70 to 70/30. Also 50/50 mixtures are possible. Thus, if for example a mixture of anhydrous sodium carbonate and anhydrous sodium hydrogen carbonate is used as the anti-caking agent, any ratio of anhydrous sodium carbonate to anhydrous sodium hydrogen carbonate can be used such as from 1/99 to 99/1 or from 10/90 to 90/10 or from 20/80 to 80/20 or from 30/70 to 70/30. Also mixtures of all three anti-caking agents in any ratio of the components are suitable.

In some embodiments, the anti-caking agent may be anhydrous sodium carbonate, anhydrous sodium hydrogen carbonate or a mixture thereof. In other embodiments, the anti-caking agent may be anhydrous sodium carbonate, sodium carbonate monohydrate or a mixture thereof. In a particularly typical embodiment, the anti-caking agent is anhydrous sodium carbonate.

The powder composition may further comprise up to 1.5 weight %, typically up to 1.0 weight %, more typically up to 0.7 weight %, even more typically up to 0.5 weight %, and most typically of up to 0.4 weight % of water and/or other inorganic compounds. The other inorganic compounds are any inorganic compounds other than sodium chlorate, anhydrous sodium carbonate, anhydrous sodium hydrogen carbonate and sodium carbonate monohydrate. The other inorganic compounds may be compounds which are commonly considered as impurities such as chlorides, chlorites and perchlorates or metals and alkali metals, such as for instance chrome, potassium and iron. The other inorganic compound may also be any suitable additional functional additives.

In some embodiments, the powder composition may be essentially free of any organic material, such as organic surfactants, solvent residues, etc. Powder composition which are devoid of such organic material are safer due to reduced risk for foaming, fire and explosion.

In some embodiments, the powder composition may comprise up to 0.5 weight %, typically up to 0.4 weight %, more typically up to 0.3 weight % and even more typically up to 0.2 weight % or even only up to 0.1% of water.

In some embodiments, the powder composition may comprise up to 0.5 weight %, typically up to 0.4 weight %, more typically up to 0.3 weight % and even more typically up to 0.2 weight % of other inorganic compounds.

For instance, the powder composition may comprise up to 0.5 weight % of water and up to 0.5 weight % of other inorganic compounds.

In a typical embodiment, the powder composition contained in the package consists of or includes from 97.0 to 99.7 weight % of sodium chlorate, from 0.3 to 2.0 weight % of anhydrous sodium carbonate, anhydrous sodium hydrogen carbonate, sodium carbonate monohydrate or a mixture of any of the foregoing as anti-caking agent, and from 0 to 1.75 weight %, typically from 0 to 1.0 weight %, more typically from 0 to 0.7 weight % and even more typically from 0 to 0.5 weight % of water and/or other inorganic compounds, wherein the total amount of sodium chlorate, the anti-caking agent, water and the other inorganic compounds sums up to 100 weight %.

In a further typical embodiment, the powder composition contained in the package consists of or includes from 98.0 to 99.7 weight % of sodium chlorate, from 0.3 to 2.0 weight % of anhydrous sodium carbonate, anhydrous sodium hydrogen carbonate, sodium carbonate monohydrate or a mixture of any of the foregoing, from 0 to 0.5 weight % of water and from 0 to 0.75 weight % of other inorganic compounds, wherein the total amount of sodium chlorate, the anti-caking agent, water and the other inorganic compounds sums up to 100 weight %.

In an even further typical embodiment, the powder composition contained in the package consists of or includes from 98.5 to 99.7 weight % of sodium chlorate based on the dry weight of the powder composition, from 0.3 to 1.0 weight % of anhydrous sodium carbonate, anhydrous sodium hydrogen carbonate, sodium carbonate monohydrate or a mixture of any of the foregoing as anti-caking agent based on the dry weight of the powder composition and from 0 to 0.5 weight % of other inorganic compounds based on the dry weight of the powder composition, wherein the total amount of sodium chlorate, the anti-caking agent, and the other inorganic compounds sums up to 100 weight %.

In an even more typical embodiment, the powder composition contained in the package consists of or includes from 98.5 to 99.7 weight % of sodium chlorate based on the dry weight of the powder composition, from 0.3 to 1.0 weight % of anhydrous sodium carbonate, anhydrous sodium hydrogen carbonate or a mixture thereof as anti-caking agent based on the dry weight of the powder composition and from 0 to 0.5 weight % of other inorganic compounds based on the dry weight of the powder composition, wherein the total amount of sodium chlorate, the anti-caking agent, and the other inorganic compounds sums up to 100 weight %.

In a particular embodiment, the powder composition contained in the package consists of or includes from 98.5 to 99.7 weight % of sodium chlorate based on the dry weight of the powder composition, from 0.3 to 1.0 weight % of anhydrous sodium carbonate as anti-caking agent based on the dry weight of the powder composition and from 0 to 0.5 weight % of other inorganic compounds based on the dry weight of the powder composition, wherein the total amount of sodium chlorate, the anti-caking agent, and the other inorganic compounds sums up to 100 weight %.

The package may contain the powder composition in principle in any form, i.e. in the form of a homogenous or heterogenous mixture. However, in a particular embodiment, the package contains the powder composition in the form of a heterogenous mixture comprising two or more phases, for instance three or more phases or five or more phases or even more than 10 phases. More particularly, the package contains the powder composition as heterogenous mixture comprising from two to ten different phases, particularly from two to four different phases.

In an embodiment the heterogenous mixture comprising the two or more phases comprises a first phase comprising ≥50 weight % sodium chlorate and a second phase comprising ≥50 weight % of the anti-caking agent. In some embodiments, the first phase essentially consists of or includes sodium chlorate and the second phase essentially consists of or includes the anti-caking agent.

It should be mentioned that the powder composition as described herein has not necessarily to be contained in the package. Rather, the above described structural features, properties and typical embodiments of the powder composition also equally apply to a powder composition as such.

It has been found that surprisingly also such heterogenous mixture has very good anti-caking properties. For instance, the anti-caking agent, i.e. the anhydrous sodium carbonate, the anhydrous sodium hydrogen carbonate, the sodium carbonate monohydrate or a mixture of any of the foregoing, can be added on the top or at the bottom of sodium chlorate in the package or somewhere in the middle of the sodium chlorate, i.e. as a middle layer. The anti-caking agent may also be added on the bottom and on the top of the sodium chlorate or at the top, middle and bottom of the package. The anti-caking additive may be added as a type of layer. In this context, it is noted that in the sense of the present disclosure, the term "layer" means that a discrete portion of the anti-caking agent is in direct surface contact with a discrete portion of the sodium chlorate. This means that for instance only part of the total amount of sodium chlorate may be covered with the anti-caking agent. In other words, it is for instance not necessary that the whole top surface of the sodium chlorate necessarily has to be covered with the anticaking agent. The advantage of a heterogenous mixture is that it can be prepared much easier than a homogeneous mixture by just separately adding the components into the package.

The present disclosure further provides a method of packaging a powder composition comprising sodium chlorate, the method comprising the steps of providing a container and adding to the container from 97.0 to 99.7 weight % sodium chlorate and from 0.3 to 2.0 weight % of an anti-caking agent, wherein the anti-caking agent is anhydrous sodium carbonate, anhydrous sodium hydrogen carbonate, sodium carbonate monohydrate or a mixture of any of the foregoing.

The powder composition and the components thereof as well as the amount ranges of the components may be as described above in the context of the package according to the present disclosure.

The container may be any suitable for packaging, transporting and/or storing sodium chlorate, such as a bag. In principle, the container may be any package as described above.

The addition of the components of the powder composition into the container is not particularly limited and any suitable order of adding the components can be employed. For instance, the sodium chlorate and the anti-caking agent may be added simultaneously or stepwise and the components may or may not be mixed after their addition into the container. The components may also be mixed before being added into the container. However, it is typical that the components may be added stepwise without substantial mixing thereby forming a heterogenous mixture comprising two or more phases, wherein a first phase comprises ≥50 weight % sodium chlorate and a second phase comprises ≥50 weight % of the anti-caking agent. In a typical embodiment the first phase essentially consists of or includes sodium chlorate and the second phase essentially consists of or includes the anti-caking agent. During such stepwise addition of the components, the anti-caking agent may be added first into the container, followed by the addition of the sodium chlorate or, alternatively, the sodium chlorate may be added first into the container, followed by the addition of the anti-caking agent. It is also possible to add in alternating addition steps more than one portion of the sodium chlorate and/or the anti-caking agent without substantial mixing. For instance, in one embodiment, in a five-step addition protocol a portion of the anti-caking agent is added first into the container, followed by the addition of sodium chlorate, then a further portion of anti-caking agent is added, followed by the addition of a further portion of sodium chlorate and, finally, an even further portion of the anti-caking agent is added. The different portions of sodium chlorate and anti-caking agent may have different sizes, i.e. it is not necessary that always exactly the same absolute amounts of the components have to be added. Rather, in case more than one portion of the anti-caking agent and/or the sodium chlorate is added, the amounts of the individual portions of the components may be adjusted according to needs. In principle, any multi-step addition protocol can be employed. However, in view of procedural efficacy, it is typical to not perform in total more than ten, typically not more than eight separate addition steps.

Surprisingly, it has been found that the desirable anti-caking properties of the anti-caking agent can also be achieved in case of a stepwise addition of sodium chlorate and the anti-caking agent, i.e. anhydrous sodium carbonate, anhydrous sodium hydrogen carbonate, sodium carbonate monohydrate or a mixture of any of the foregoing, without any substantial mixing of the components.

The at least two phases may also be combined so to form a layered structure comprising at least one first layer of the first phase and at least one layer of the second phase. In some embodiments, the layered structure may comprise in total more than two layers of the first layer and/or the second layer, wherein at least two layers are of the same type of layer, i.e. wherein at least two layers are either of the type of the first layer or of the type of the second layer.

The present disclosure further relates to the use of anhydrous sodium carbonate, anhydrous sodium hydrogen carbonate, sodium carbonate monohydrate or a mixture of any of the foregoing as an anti-caking agent in a package containing a powder composition comprising at least 97.0 weight %, typically at least 98.0 weight %, more typically at least 98.2 weight %, even more typically at least 98.5 weight % and most typically at least 99.0 weight % sodium chlorate. The amount of anti-caking agent may be as described above in the context of the package of the present disclosure.

EXAMPLES

The present disclosure will be further described in connection with the following, non-limiting examples.

Example 1

Three packages containing 0.8 weight % of anhydrous sodium carbonate ($Na_2CO_3$, from Diatom Mineração Ltda; Sodium Carbonate Anhydrous (BLEVE-M-BB9900); purity ≥99.0 weight %,; density 618 g/l) and 99.2 weight % of a commercial sodium chlorate powder (NaClO3, from Nouryon; EKA SC; purity ≥99.6 weight %) were prepared.

Each package was prepared according to the following seven-step addition protocol by first filling about 2.5 kg of anhydrous sodium carbonate into a 1 m3 big bag made of woven polypropylene with a liner of polyethylene. About 417 kg of freshly prepared sodium chlorate (≤0.2 weight % water) was thereafter added into the bag containing the sodium carbonate. Then about 2.5 kg of additional anhydrous sodium carbonate followed by about 417 kg of freshly prepared sodium chlorate, a second addition of 2.5 kg of additional anhydrous sodium carbonate followed by about 417 kg of freshly prepared sodium chlorate and finally about 2.5 kg of additional anhydrous sodium carbonate were added into the bag. In total 10 kg of sodium carbonate were added to 1250 kg sodium chlorate.

The three packages were stored for 150 days in a dry storage room ventilated versus outdoor conditions, i.e. at about 25° C. and about 80% humidity on average.

When opening the bags after 150 days of storage, the powder was almost free flowing with few soft lumps, see FIG. 1.

Reference Example 1

Three packages containing a commercial sodium chlorate powder (NaClO3, from Nouryon; EKA SC; purity ≥99.6 weight %) were prepared.

Each package was prepared by filling about 1250 kg freshly prepared commercial sodium chlorate (≤0.2 weight % water) into a 1 m3 big bag made of woven polypropylene with a liner of polyethylene. The three packages were stored for 150 days at the same conditions as the packages of Example 1.

Figure 2:
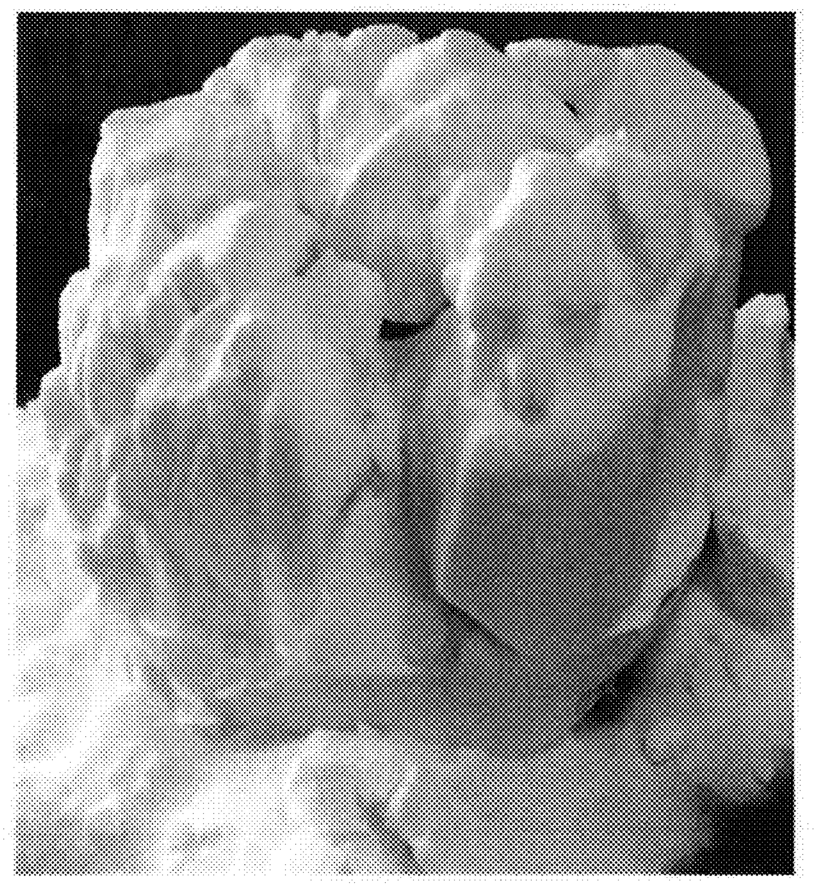
FIG. 2 is a photo of the comparative sodium carbonate composition from Reference Example 1 after being stored for 150 days.

When opening the bags after 150 days of storage, the powder was severely lumped with hard lumps, see FIG. 2.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. A package comprising a powder composition comprising:
- from about 98.2 to about 99.7 weight % of sodium chlorate; and
- from about 0.3 to about 1.0 weight % of an anti-caking agent;

wherein the anticaking agent is anhydrous sodium carbonate, anhydrous sodium hydrogen carbonate, sodium carbonate monohydrate or a mixture of any of the foregoing.

2. The package according to claim 1, wherein the powder composition further comprises:
- from greater than zero and up to about 1.5 weight % of water and/or other inorganic compounds.

3. The package according to claim 2, wherein the powder composition consists of the sodium chlorate, the anti-caking agent, and the water and/or other inorganic compounds.

4. The package according to claim 1, wherein the powder composition further comprises from greater than zero and up to about 0.5 weight % of water.

5. The package according to claim 4, wherein the powder composition consists of the sodium chlorate, the anti-caking agent, and the water.

6. The package according to claim 1, wherein the powder composition further comprises from greater than zero and up to about 0.5 weight % of other inorganic compounds.

7. The package according to claim 6, wherein the powder composition consists of the sodium chlorate, the anti-caking agent and the other inorganic compounds.

8. The package according to claim 1, wherein the powder composition consists of the sodium chlorate and the anti-caking agents.

9. The package according to claim 1, wherein the anti-caking agent is anhydrous sodium carbonate.

10. The package according to claim 1, wherein the powder composition is a heterogenous mixture comprising two or more phases.

11. The package according to claim 10, wherein the heterogenous mixture comprising the two or more phases comprises a first phase comprising ≥about 50 weight % of the sodium chlorate and a second phase comprising ≥about 50 weight % of the anti-caking agent.

12. The package according to claim 11, wherein the first phase consists essentially of the sodium chlorate and the second phase consists essentially of the anti-caking agent.

13. A method of packaging a powder composition comprising sodium chlorate, the method comprising the steps of:
- providing a container; and
- adding to the container from about 98.2 to about 99.7 weight % sodium chlorate and from about 0.3 to about 1.0 weight % of an anti-caking agent, wherein the anticaking agent is anhydrous sodium carbonate, anhydrous sodium hydrogen carbonate, sodium carbonate monohydrate or a mixture of any of the foregoing, wherein optionally the sodium chlorate and the anti-caking agent are added stepwise without substantial mixing thereby forming a heterogenous mixture comprising two or more phases, wherein a first phase comprises ≥about 50 weight % sodium chlorate and a second phase comprises ≥about 50 weight % of the anti-caking agent.

14. The method of claim 13 wherein the first phase consists essentially of the sodium chlorate and the second phase consists essentially of the anti-caking agent.

15. The method of claim 13 wherein the first phase consists of the sodium chlorate and the second phase consists of the anti-caking agent.

16. A package comprising a powder composition consisting of:

from about 98.5 to about 99.7 weight % of the sodium chlorate based on the dry weight of the powder composition;

from about 0.3 to about 1.0 weight % of the anti-caking agent based on the dry weight of the powder composition;

optionally from 0 to about 0.5 weight % of other inorganic compounds based on the dry weight of the powder composition;

wherein the total amount of sodium chlorate, the anti-caking agent, and the optional water and/or other inorganic compounds sums up to about 100 weight %; and wherein the anticaking agent is anhydrous sodium carbonate, anhydrous sodium hydrogen carbonate, sodium carbonate monohydrate or a mixture of any of the foregoing.

* * * * *